(12) United States Patent
Toyota et al.

(10) Patent No.: US 11,541,729 B2
(45) Date of Patent: Jan. 3, 2023

(54) VEHICLE

(71) Applicant: TOYOTA JIDOSHA KABUSHIKI KAISHA, Toyota (JP)

(72) Inventors: Masaru Toyota, Toyota (JP); Sho Tsumita, Seto (JP); Yoshiyuki Ryuno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 17/345,713

(22) Filed: Jun. 11, 2021

(65) Prior Publication Data

US 2022/0055459 A1     Feb. 24, 2022

(30) Foreign Application Priority Data

Aug. 18, 2020   (JP) .............................. JP2020-138242

(51) Int. Cl.
    *B60J 1/17*          (2006.01)
    *B60R 13/02*        (2006.01)
    *B60J 5/04*          (2006.01)

(52) U.S. Cl.
    CPC .............. *B60J 1/17* (2013.01); *B60R 13/0237* (2013.01); *B60J 5/0408* (2013.01)

(58) Field of Classification Search
    CPC ........ B60J 1/17; B60J 5/0402; B60R 13/0237
    USPC ......................................... 296/146.16, 146.2
    See application file for complete search history.

(56) References Cited

U.S. PATENT DOCUMENTS

| | | | |
|---|---|---|---|
| 4,348,046 A * | 9/1982 | Ohya ........................ | B60J 1/17 49/164 |
| 6,260,905 B1 * | 7/2001 | Wagner .................. | B60J 1/1861 49/374 |
| 8,429,865 B2 * | 4/2013 | Nania ...................... | B60J 1/004 296/201 |
| 11,280,114 B2 * | 3/2022 | Walters .................... | B60J 1/006 |
| 11,376,929 B2 * | 7/2022 | Pennings ................ | E05B 83/36 |
| 11,453,273 B2 * | 9/2022 | Toyota .................... | B60J 1/2097 |
| 2012/0068478 A1 * | 3/2012 | Nania ...................... | E05B 83/04 296/146.16 |
| 2022/0009320 A1 * | 1/2022 | Toyota .................... | B60J 1/006 |
| 2022/0024287 A1 * | 1/2022 | Toyota .................... | B60J 1/2097 |
| 2022/0032745 A1 * | 2/2022 | Toyota .................... | B60J 5/0402 |
| 2022/0063383 A1 * | 3/2022 | Toyota .................... | B60J 1/004 |

FOREIGN PATENT DOCUMENTS

| | | |
|---|---|---|
| JP | 2002-321526 A | 11/2002 |
| JP | 2007-030706 A | 2/2007 |
| JP | 2015-193275 A | 11/2015 |

* cited by examiner

*Primary Examiner* — Jason S Morrow
(74) *Attorney, Agent, or Firm* — Sughrue Mion, PLLC (57) ABSTRACT

A vehicle described in the present specification is configured such that a door includes an outer panel, a door trim, window glass configured to be manually raised and lowered, a belt molding, and a knob. The window glass is supported movably between an upper limit position at which the window glass closes an opening of a window frame and a lower limit position at which the window glass opens the opening of the window frame. The knob is configured to be gripped by a user who operates the window glass. The door trim includes a recess configured to face the knob and form a space when the window glass is placed at the lower limit position, the space being formed to receive a hand of the user, the hand gripping the knob.

8 Claims, 5 Drawing Sheets

VEHICLE

CROSS-REFERENCE TO RELATED APPLICATION

This application claims priority to Japanese Patent Application No. 2020-138242 filed on Aug. 18, 2020, incorporated herein by reference in its entirety.

BACKGROUND

1. Technical Field

The technology described in the present specification relates to a vehicle.

2. Description of Related Art

A small one-passenger vehicle is described in Japanese Unexamined Patent Application Publication No. 2007-30706 (JP 2007-30706 A). An outer panel of a door of the vehicle is made of synthetic resin, and hereby, a reduction in the weight of the vehicle is achieved.

Japanese Unexamined Patent Application Publication No. 2015-193275 (JP 2015-193275 A) describes a door including an outer panel, a door trim, window glass, and a belt molding. The belt molding is placed between the outer panel and the window glass and slidably makes contact with the outer surface of the window glass. The door trim is a trim panel of the door and faces the outer panel across the belt molding. With such a configuration, it is possible to prevent the belt molding from being exposed to a user inside a vehicle cabin.

SUMMARY

In a general vehicle, window glass provided in a door is opened and closed by a raising-lowering device. The raising-lowering device for the window glass is placed inside the door and includes a mechanism configured to move the window glass in the up-down direction in response to an operation of a motor or a user operation. In this respect, it is conceivable that window glass configured to be manually raised and lowered may be employed for a small vehicle as described in JP 2007-30706 A. The window glass configured to be manually raised and lowered indicates window glass that is operated in the up-down direction directly by a user without the use of a raising-lowering device. The use of the window glass configured to be manually raised and lowered makes it unnecessary to use the raising-lowering device, thereby making it possible to reduce the weight of the vehicle, for example.

The window glass configured to be manually raised and lowered is configured to be movable between an upper limit position at which the window glass closes an opening of a window frame and a lower limit position at which the window glass opens the opening of the window frame. The user grips a knob provided on the inner surface of the window glass and moves the window glass in the vehicle up-down direction. When the window glass is placed at the lower limit position, the knob is closest to a door trim. Even when the window glass is placed at the lower limit position, it is necessary to leave a space between the knob and the door trim so that the space receives the finger of the user. In this regard, when the lower limit position of the window glass is set to a high position, the space left between the knob and the door trim can be made large, but the area by which the opening of the window frame is opened is reduced. That is, the functionality of the window glass is impaired. In the meantime, when the lower limit position of the window glass is set to be low, the area by which the opening of the window frame is opened can be made large, but there is such a risk that a sufficient space cannot be left between the knob and the door trim. That is, the operationality for the user might be impaired.

In terms of this problem, it is conceivable that a recess is provided in the door trim. The recess is provided at a position where the recess faces the knob when the window glass is placed at the lower limit position. With such a configuration, even when the knob is brought close to the door trim, a space that can receive the finger of the user can be left between the knob and the recess of the door trim. Hereby, while the lower limit position of the window glass is set to be lower so as to increase the area by which the opening of the window frame is opened, a necessary space can be left between the knob and the door trim. However, when the recess is provided in the door trim, there is such a risk that the belt molding placed outward of the door trim in the vehicle width direction might be exposed, so that the belt molding might be seen through the recess of the door trim from the user in the vehicle cabin. That is, the design property (outward appearance) of the vehicle might be impaired.

In consideration of the above problem, the present specification provides a technology that can achieve both functionality and operationality of window glass configured to be manually raised and lowered, without impairing a design property in a vehicle that employs the window glass configured to be manually raised and lowered.

A vehicle described in the present specification includes: a vehicle body; and a door provided openably and closably in the vehicle body, the door including a window frame. The door includes: an outer panel; a door trim placed inward of the outer panel in the vehicle width direction; window glass configured to be manually raised and lowered, the window glass being placed between the outer panel and the door trim, the window glass being supported movably between an upper limit position at which the window glass closes an opening of the window frame and a lower limit position at which the window glass opens the opening of the window frame; a belt molding fixed to an inner surface of the outer panel, the belt molding slidably making contact with an outer surface of the window glass; and a knob provided on an inner surface of the window glass, the knob being configured to be gripped by a user who operates the window glass. The door trim includes a recess configured to face the knob when the window glass is placed at the lower limit position. When the window glass is placed at the lower limit position, a space is formed between the knob and an inner surface of the recess such that the space receives a hand of the user, the hand gripping the knob. At least part of the inner surface of the recess is placed below, in the vehicle up-down direction, an upper end part of the belt molding in the vehicle up-down direction. A wall surface extending upward, in the vehicle up-down direction, of the upper end part of the belt molding is provided on an inner side or an outer side of the recess of the door trim in the vehicle width direction. Here, the window glass configured to be manually raised and lowered indicates window glass that is operated in the up-down direction directly by a user without the use of a mechanism such as a raising-lowering device, for example.

In the vehicle described above, the space that receives the hand, of the user, that grips the knob is secured by the recess provided in the door trim. Hereby, even in a case where the lower limit position of the window glass is set to be low, the user can grip the knob when the window glass is placed at the lower limit position. As described earlier, by setting the lower limit position of the window glass to be low, it is possible to increase the area by which the opening of the window frame is opened. Further, the wall surface extending upward, in the vehicle up-down direction, of the upper end part of the belt molding is provided on the inner side or the outer side of the recess in the vehicle width direction. This makes it possible to avoid the belt molding from being observed from the user inside a vehicle cabin. Thus, with the vehicle described in the present disclosure, the functionality and the operationality of the window glass configured to be manually raised and lowered are improved without impairing a design property.

Technical details described in the present specification and further improvements thereof will be described in "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

In one aspect of this technology, the wall surface may be placed on the outer side of the recess in the vehicle width direction. With such a configuration, the user easily accesses the space between the knob and the inner surface of the recess from the inside of the vehicle. That is, it is possible to further increase the operationality for the user.

In one aspect of this technology, at least part, of the door trim, that is placed around the recess may be placed inward, in the vehicle width direction, of an inner end part of the knob in the vehicle width direction. As described above, due to the recess provided in the door trim, the space that receives the hand, of the user, that grips the knob is secured. Accordingly, in a part placed around the recess, the shape of the door trim does not have any restriction in particular, and thus, the door trim may be projected inward in the vehicle width direction to a position exceeding a distal end of the knob, for example.

In one aspect of this technology, the inner surface of the recess may be inclined downward in the vehicle up-down direction as the inner surface is distanced from the wall surface. With such a configuration, the user easily accesses the space between the knob and the inner surface of the recess from the inside of the vehicle. That is, it is possible to further increase the operationality for the user.

In one aspect of this technology, the inner surface of the recess may have an asymmetric shape in the vehicle front-rear direction. With such a configuration, the space between the knob and the inner surface of the recess can be designed freely depending on the positional relationship between the user and the knob, for example. As a result, the user easily accesses the space between the knob and the inner surface of the recess. That is, it is possible to further increase the operationality for the user.

In the above aspect, the direction where the window glass moves may be inclined from the vehicle up-down direction when the window glass is viewed along the vehicle right-left direction. In other words, in a case where the direction where the window glass moves is inclined from the vehicle up-down direction when the window glass is viewed along the vehicle right-left direction, the inner surface of the recess may be designed to have an asymmetric shape in the vehicle front-rear direction. Hereby, the user easily accesses the space between the knob and the inner surface of the recess and easily operates the window glass.

In one aspect of this technology, the door may further include a knob fixture provided on the outer surface of the window glass such that the knob is fixed to the knob fixture via the window glass. With such a configuration, the knob can be fixed to the window glass with a relatively simple structure.

In the above aspect, the knob may include a movable hook to be operated by the user. In this case, the window frame may include a hook receiver configured to lock the window glass by engaging with the hook when the window glass is placed at the upper limit position. Hereby, the window glass placed at the upper limit position may be locked so that the window glass does not move down.

With reference to the drawings, a vehicle 10 of an embodiment will be described. The vehicle 10 of the present embodiment is a so-called automobile and is a vehicle configured to travel on a road surface. Here, a direction FR in the drawings indicates the front side in the front-rear direction (the longitudinal direction) of the vehicle 10, and a direction RR indicates the rear side in the front-rear direction of the vehicle 10. Further, a direction LH indicates the left side in the right-left direction (the width direction) of the vehicle 10, and a direction RH indicates the right side in the right-left direction of the vehicle 10. A direction UP indicates the upper side in the up-down direction (the height direction) of the vehicle 10, and a direction DN indicates the lower side in the up-down direction of the vehicle 10. Note that, in the present specification, the front-rear direction, the right-left direction, and the up-down direction of the vehicle 10 may be just referred to as the front-rear direction, the right-left direction, and the up-down direction.

Figure 1:
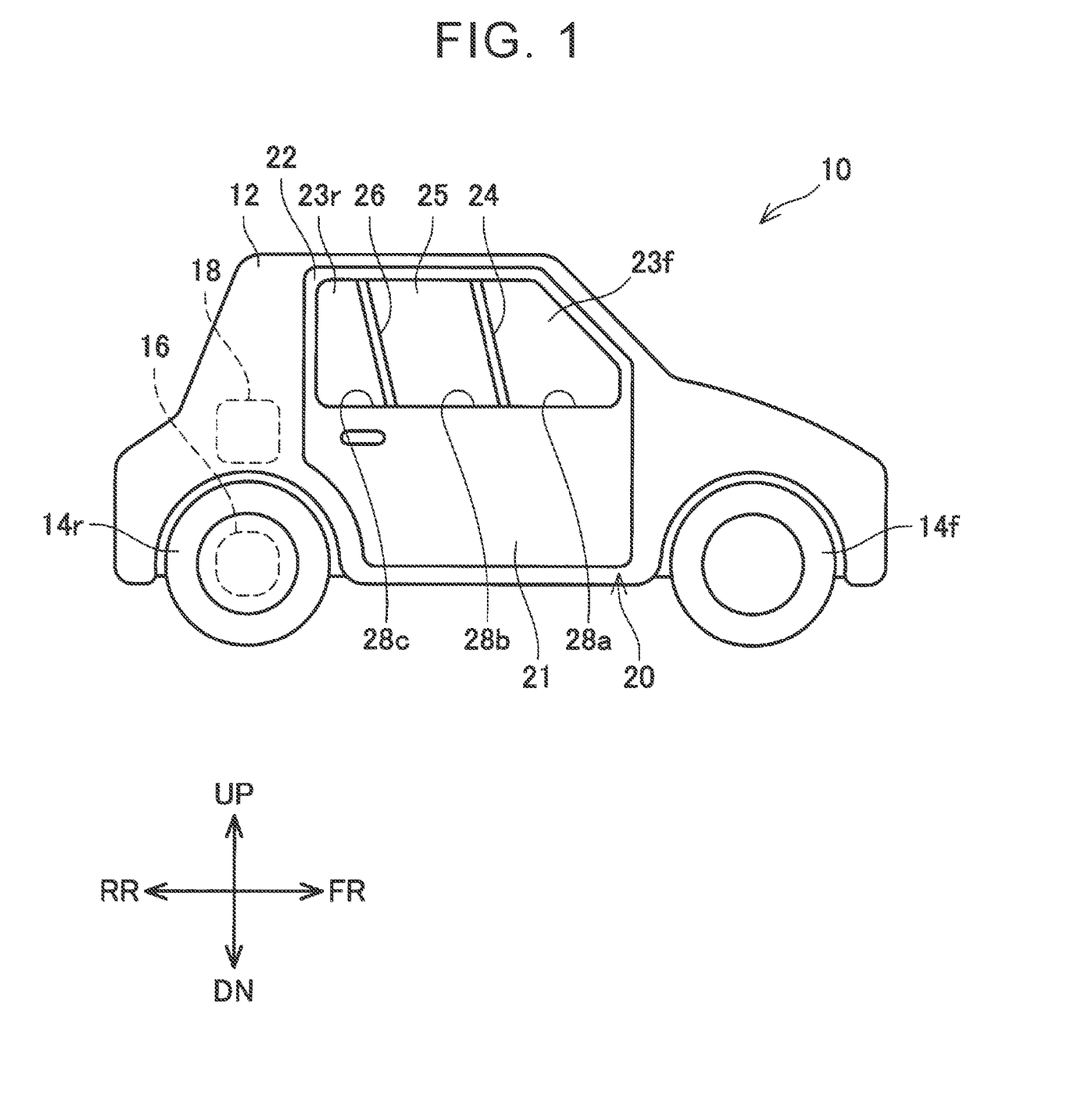
FIG. 1 is a right side view schematically illustrating a whole vehicle according to an embodiment.

As illustrated in FIG. 1, the vehicle 10 includes a vehicle body 12 and a plurality of wheels 14*f*, 14*r*. The vehicle body 12 is not limited in particular, but the vehicle body 12 is formed by use of a metallic material and a resin material. The wheels 14*f*, 14*r* are rotatably attached to the vehicle body 12. The wheels 14*f*, 14*r* include a pair of front wheels 14*f* and a pair of rear wheels 14*r*. Note that the number of the wheels 14*f*, 14*r* is not limited to four. The vehicle 10 in the present embodiment has a small size for one occupant, but the size of the vehicle 10 and the number of occupants are also not limited in particular.

The vehicle 10 further includes a drive motor 16 and a battery unit 18. The drive motor 16 is connected to the rear wheels 14*r*, so that the drive motor 16 can drive the rear wheels 14*r*. Note that the drive motor 16 is not limited to driving the rear wheels 14*r*, provided that the drive motor 16 is configured to drive at least one of the wheels 14f, 14r. The battery unit 18 is connected to the drive motor 16 via a power supply circuit (not shown), so that the battery unit 18 supplies electric power to the drive motor 16. A plurality of secondary battery cells is incorporated in the battery unit 18, so that the battery unit 18 is chargeable repeatedly by electric power received from outside. Note that the vehicle 10 may include other power supplies such as a fuel cell unit or a solar panel in addition to or instead of the battery unit 18. Further, the vehicle 10 may include other motors such as an engine in addition to or instead of the drive motor 16.

The vehicle 10 further includes a door 20. The door 20 is placed on the right side of the vehicle body 12 and is provided openably and closably in the vehicle body 12. The door 20 is a door for a user to get in and out of the vehicle 10. The door 20 is attached to the vehicle body 12 via a hinge (not shown) and is configured to be swingable in the horizontal direction. The outer side of the door 20 in the vehicle width direction (that is, on the near side on the plane of paper of FIG. 1) is covered with an outer panel 21, and a window frame 22 is provided on the upper side of the outer panel 21. The outer panel 21 is not limited in particular, but the outer panel 21 is made of synthetic resin. When the outer panel 21 is made of synthetic resin, the vehicle 10 is reduced in weight.

Two sash bars 24, 26 (a first sash bar 24 and a second sash bar 26) are provided inside the window frame 22. The two sash bars 24, 26 are provided in parallel to each other. The two sash bars 24, 26 extend to be inclined rearward toward the upper side. The window frame 22 and the two sash bars 24, 26 define three window openings 28a, 28b, 28c. Note that the door 20 may be provided on the left side of the vehicle body 12. The position of the door 20 can be designed in accordance with regulations or the like of countries or districts. Further, the two sash bars 24, 26 may extend in parallel to each other in the vehicle up-down direction without extending to be inclined rearward toward the upper side.

The three window openings 28a, 28b, 28c include a first window opening 28a, a second window opening 28b, and a third window opening 28c. The first window opening 28a is placed most forward among the three window openings 28a, 28b, 28c and is surrounded by the window frame 22 and the first sash bar 24. First window glass 23f is provided in the first window opening 28a. The first window glass 23f is window glass that is not openable and closable, and the first window glass 23f is fixed to the window frame 22 and the first sash bar 24. The second window opening 28b is placed at an intermediate position and is surrounded by the window frame 22 and the two sash bars 24, 26. Second window glass 25 is provided in the second window opening 28b. The second window glass 25 is window glass that is openable and closable, and the second window glass 32 is attached movably along the two sash bars 24, 26. Third window glass 23r is provided in the third window opening 28c. The third window glass 23r is window glass that is not openable and closable, and the third window glass 23r is fixed to the window frame 22 and the second sash bar 26. Here, each window glass 23f, 25, 23r is not limited to glass and may be constituted by other transparent or translucent materials such as acryl resin, for example.

The second window glass 25 is window glass configured to be manually raised and lowered. The window glass configured to be manually raised and lowered indicates window glass that is operated in the up-down direction directly by a user without the use of a mechanism such as a conventional raising-lowering device, for example. The following description will describe the second window glass 25 and its related configuration in detail, with reference to FIGS. 2, 3. Note that, in the following description, the second window opening 28b may be just referred to as the window opening 28b, and the second window glass 25 may be just referred to as the window glass 25.

Figure 2:
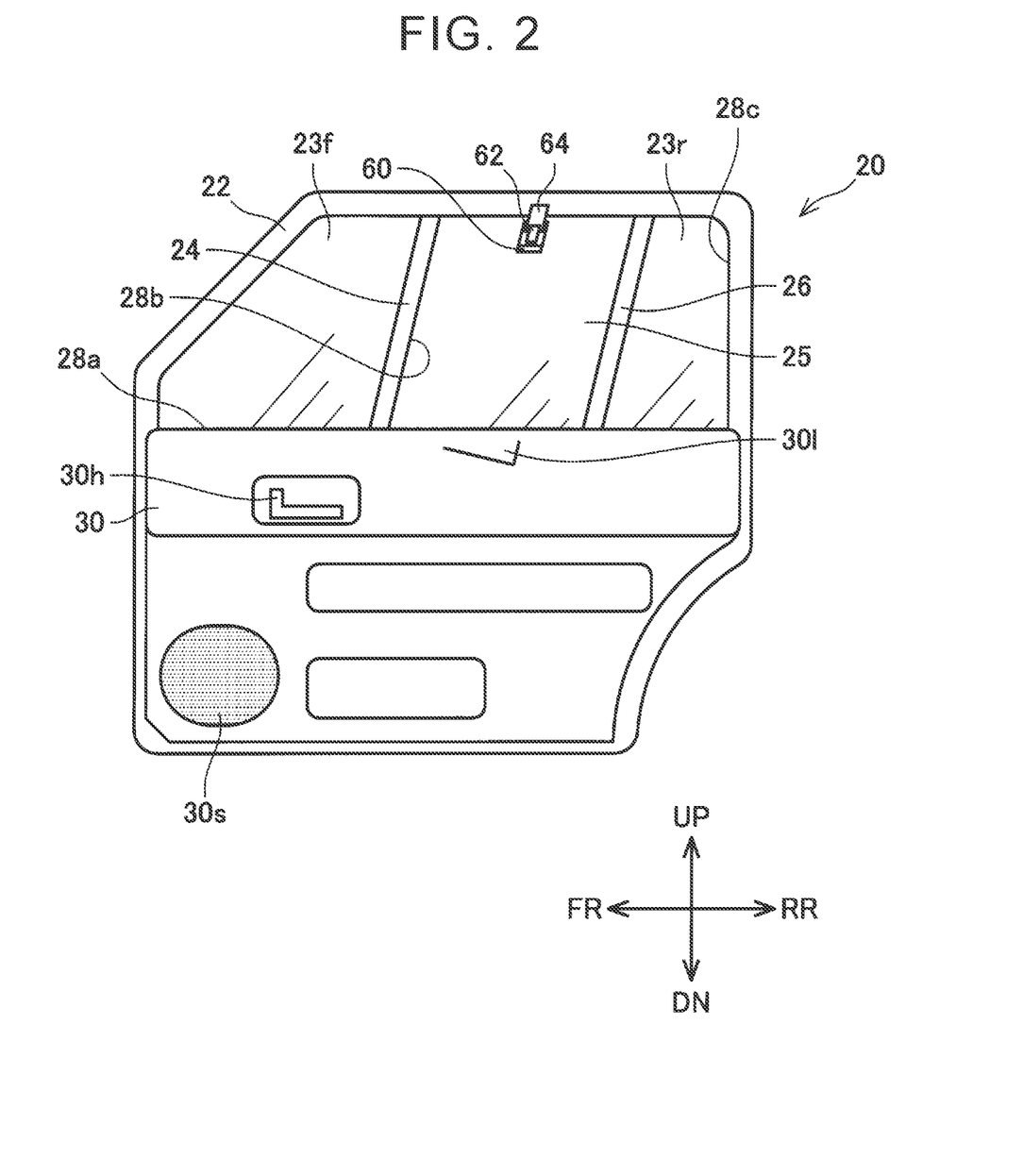
FIG. 2 is a front view of a door of the vehicle according to the embodiment when the door is viewed from the inside of the vehicle and illustrates a state where window glass is placed at an upper limit position.
Figure 3:
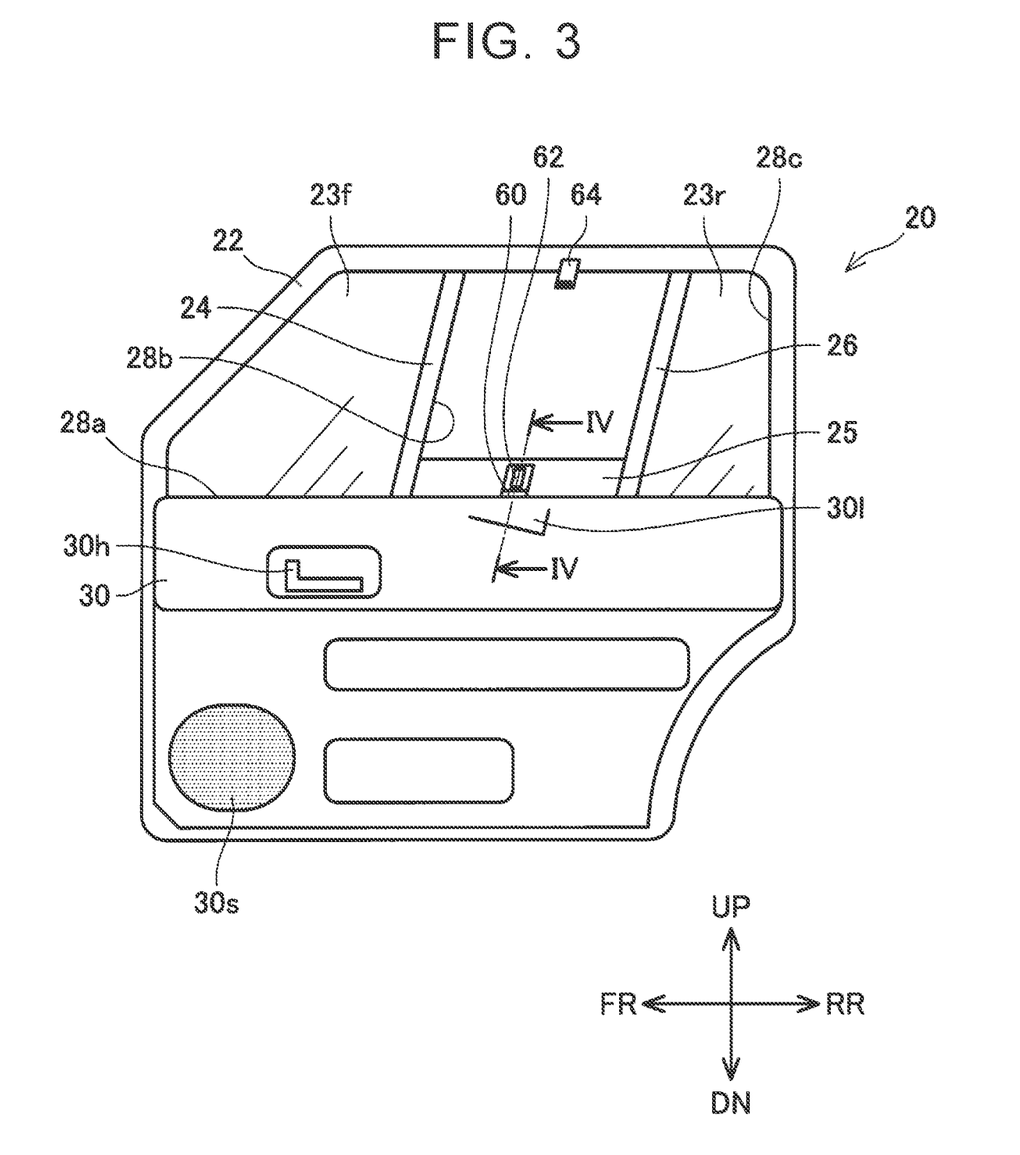
FIG. 3 is a front view of the door of the vehicle according to the embodiment when the door is viewed from the inside of the vehicle and illustrates a state where the window glass is placed at a lower limit position.

FIGS. 2, 3 are front views of the door 20. That is, FIGS. 2, 3 illustrate the shape of the door 20 when the door 20 is seen from the inside of the vehicle cabin along the right-left direction of the vehicle 10. As illustrated in FIGS. 2, 3, the window glass 25 is operated directly by the user to move in the up-down direction between an upper limit position at which the window glass 25 closes the window opening 28b and a lower limit position at which the window glass 25 opens the window opening 28b. The opposite ends of the window glass 25 in the vehicle front-rear direction are slidably supported by the two sash bars 24, 26. The window glass 25 moves in the vehicle up-down direction along the two sash bars 24, 26. The two sash bars 24, 26 are inclined rearward as they go upward. On this account, the direction where the window glass 25 moves is inclined rearward in the vehicle front-rear direction from the vehicle up-down direction.

A knob 60 to be gripped by the user is provided in the window glass 25. The knob 60 is attached to the inner surface of the window glass 25 (that is, the surface on the near side on the plane of paper of FIG. 2), and the knob 60 projects from the inner surface of the window glass 25. The user can easily operate the window glass 25 by use of the knob 60 from the inside of the vehicle cabin. That is, the user can raise the window glass 25 by gripping the knob 60 or can lower the window glass 25 by gripping the knob 60. The user operates the knob 60 in a state where the user sits on a seat (not shown) placed to face a rear part of a door trim 30. If the two sash bars 24, 26 are not inclined from the vehicle up-down direction, and the knob 60 placed at the lower limit position is moved straight upward, the distance between the user and the knob 60 becomes longer as the knob 60 is moved upward. Because of this, it is hard for the user to operate the knob 60. As has been described earlier, the door 20 of the vehicle 10 (see FIG. 1) according to the embodiment is configured such that the window glass 25 is moved to be inclined rearward in the vehicle front-rear direction toward the upper side in the vehicle up-down direction. On this account, the distance between the user and the knob 60 moved upward can hardly become longer. That is, the user can easily operate the knob 60.

The knob 60 is provided with a movable hook 62 to be operated by the user. Meanwhile, the window frame 22 is provided with a hook receiver 64 corresponding to the hook 62. When the window glass 25 is placed at the upper limit position, the hook receiver 64 engages with the hook 62. Hereby, the window glass 25 placed at the upper limit position is locked so that the window glass 25 does not move down by deadweight, for example. Here, the positions of the knob 60, the hook 62, and the hook receiver 64 are not limited in particular. For example, the knob 60 and the hook 62 may be provided at different positions. Alternatively, the hook 62 may be provided in the window frame 22 while the hook receiver 64 may be provided in the window glass 25.

As illustrated in FIGS. 2, 3, the door trim 30 is placed below the three window openings 28a, 28b, 28c. The door trim 30 includes an inside handle 30h and a speaker grille 30s. The door trim 30 is a component decorating the inner surface of the door 20. The door trim 30 improves the outward appearance of the door 20 viewed from the inside of the vehicle cabin by covering the inner part of the door 20.

The door trim 30 is mainly made of resin. The inside handle 30h is a handle to be operated by the user so as to open the door 20 from the inside of the vehicle. The speaker grille 30s has a plurality of through-holes on its surface. Sound output from a speaker (not shown) housed inside the door 20 reaches the user inside the vehicle cabin through the speaker grille 30s.

As illustrated in FIG. 3, when the window glass 25 is placed at the lower limit position, a space between the knob 60 and the door trim 30 is small. A recess 301 is provided in an upper part of the door trim 30. The knob 60 placed at the lower limit position faces the recess 301.

Figure 4:
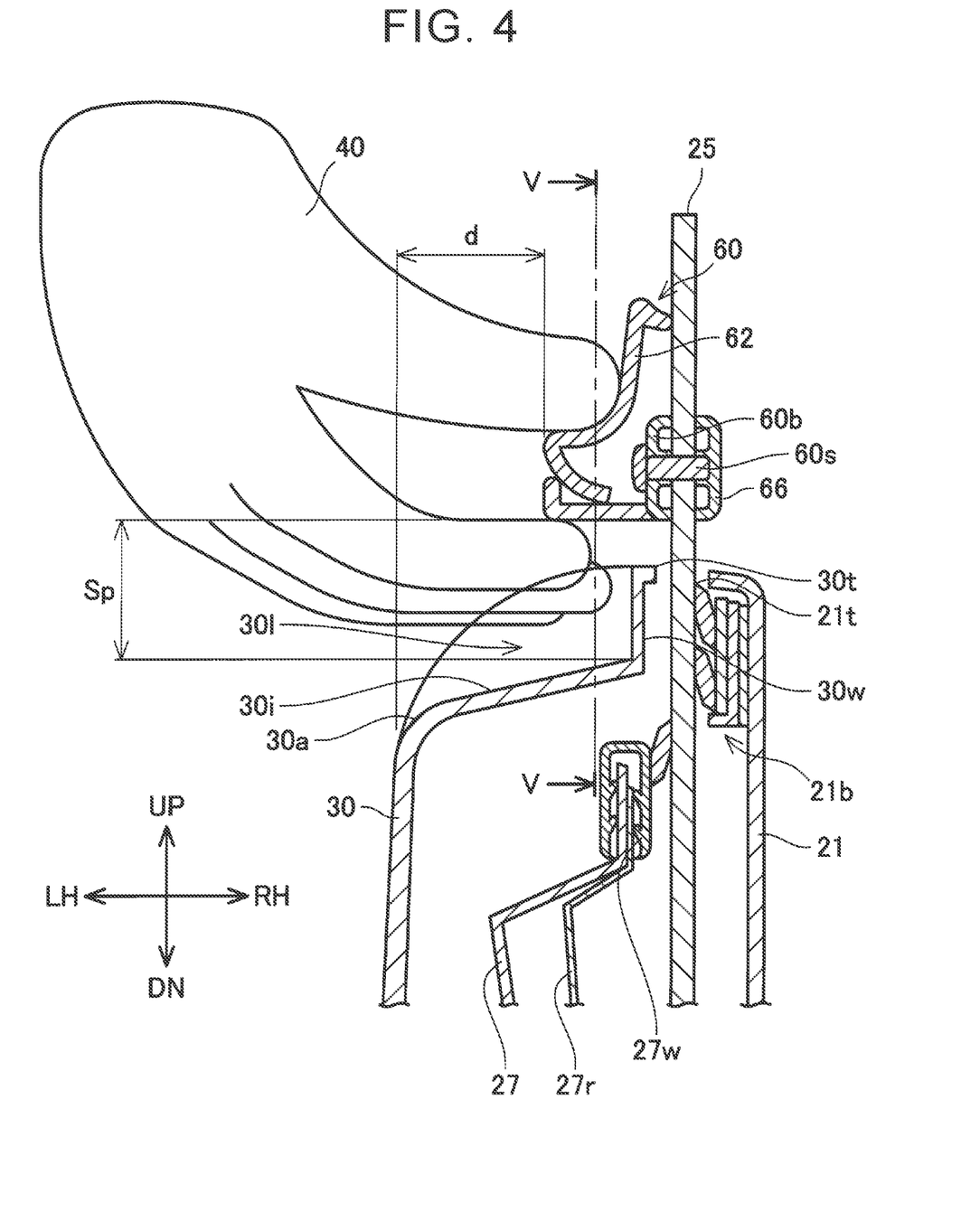
FIG. 4 is a sectional view taken along a line IV-IV in FIG. 3.
Figure 5:
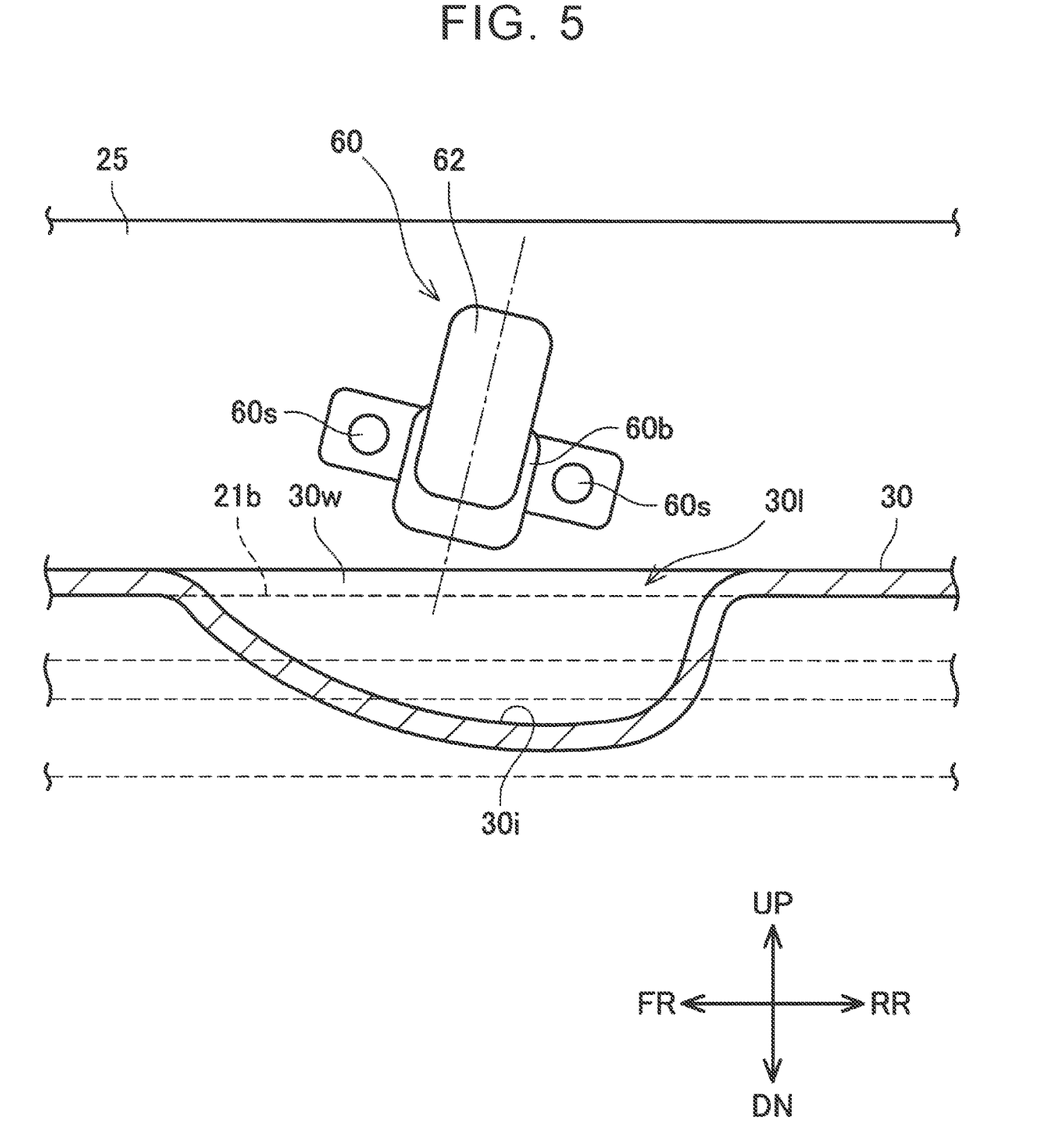
FIG. 5 is a sectional view taken along a line V-V in FIG. 4.

With reference to FIGS. 4, 5, the following describes the positional relationship between the recess 301 and the knob 60 placed at the lower limit position. FIG. 4 is a sectional view taken along a line IV-IV in FIG. 3. As illustrated in FIG. 4, the knob 60 includes a hook 62, a base portion 60b, a fixture 66, and a screw 60s. Note that FIG. 4 is a sectional view at the center of the knob 60 but also includes a section of the screw 60s placed in front of the center of the knob 60.

The hook 62 includes a hinge (not shown) extending in the vehicle front-rear direction, and the hinge is rotatably fixed to the base portion 60b. The user holds the knob 60 with a hand 40 and raises the window glass 25 to the upper limit position. At this time, as has been described earlier with reference to FIG. 2, when the window glass 25 is moved to the upper limit position, the user hooks the upper end of the hook 62 on the hook receiver 64 by rotating the hook 62. Hereby, the window glass 25 is held at the upper limit position. The base portion 60b is placed to face the fixture 66 via the window glass 25. The screw 60s penetrates through the base portion 60b from the inside of the vehicle and threadedly engages with the fixture 66, so that the knob 60 is fixed to the window glass 25. As illustrated in FIG. 5, respective screws 60s are placed on the opposite sides of the hook 62 in the front-rear direction. Note that the knob 60 may be fixed to the inner surface of the window glass 25 by bonding.

In order to increase the area by which the window opening 28b (see FIG. 1) is opened, the lower limit position of the window glass 25 should be set to be lower. The lower limit position of the window glass 25 is set so that a predetermined gap can be secured between the lower surface of the knob 60 and an upper end 30t of the door trim 30. Here, the predetermined gap is a space that avoids interference between the lower surface of the knob 60 and the upper end 30t of the door trim 30 even in a case where the vehicle 10 (see FIG. 1) vibrates at the time of traveling. Note that, depending on the shape of the knob 60 and the position of the upper end 30t of the door trim 30, the lower limit position of the window glass 25 may be set based on a gap between the fixture 66 and the upper end of the outer panel 21.

Further, as illustrated in FIG. 4, a peripheral portion 30a placed in an end part, on the left side (that is, on the inner side in the vehicle width direction), of an inner surface 30i of the recess 301 is placed closer to the left side from a left end part of the hook 62 only by a distance d. On this account, if the recess 301 is not provided in the door trim 30, only a space that avoids the interference at the time of vibrations of the vehicle is provided between the lower surface of the knob 60 and the upper end 30t of the door trim 30. In that case, it is difficult for the user to put the hand 40 below the knob 60. That is, in a case where the recess 301 is not provided in the door trim 30, it is difficult for the hand 40 of the user to grip the knob 60. In the door trim 30 of the vehicle 10 (see FIG. 1) of the embodiment, the hand 40 of the user is received by a space Sp between the knob 60 and the inner surface 30i of the recess 301. Even in a case where the peripheral portion 30a, of the door trim 30, that is placed around the recess 301 projects inwardly in the vehicle width direction from an inner end part of the hook 62 (that is, the knob 60) in the vehicle width direction, the user can put the hand 40 below the knob 60 and grip the knob 60.

Further, as illustrated in FIG. 4, an inner panel 27, an inner reinforcement 27r, and an inner weather strip 27w are placed inside the door trim 30. Further, the outer panel 21 and a belt molding 21b are placed on the right side of the door trim 30 (that is, outward of the door trim 30 in the vehicle width direction). The inner panel 27 is a sheet metal part provided on the inner side of the door 20 (see FIG. 2) in the vehicle width direction, and the door trim 30 is fixed to the inner panel 27. The inner reinforcement 27r is a sheet metal part configured to partially reinforce the inner panel 27. The inner weather strip 27w is fixed by being inserted in the upper ends of the inner panel 27 and the inner reinforcement 27r. The inner weather strip 27w is typically made of a rubber material. The rubber material elastically deforms when it abuts with the window glass 25. Hereby, the inner weather strip 27w seals between the inner panel 27 and the window glass 25. The rubber material may be natural rubber or synthetic rubber. Note that the rubber material used herein includes a material called elastomer.

Flocking (not shown) is performed on a surface of a lip of the inner weather strip 27w, the lip extending toward the inner surface of the window glass 25. When a flocked part of the lip of the inner weather strip 27w abuts with the inner surface of the window glass 25, a frictional force to be caused between the inner surface of the window glass 25 and the lip of the inner weather strip 27w is reduced. As a result, the window glass 25 smoothly moves on the surface of the lip of the inner weather strip 27w. As such, the inner weather strip 27w slidably makes contact with the inner surface of the window glass 25 by the lip. The inner weather strip 27w seals between the inner panel 27 and the window glass 25. Note that the inner panel 27 and the inner reinforcement 27r are not limited to the sheet metal parts and may be made of resin.

As described earlier, the outer panel 21 is made of synthetic resin. The belt molding 21b is fixed to the left surface of the outer panel 21 (that is, the inner surface of the outer panel 21 in the vehicle width direction). The belt molding 21b is fixed to the inner surface of the outer panel 21 by bonding. Similarly to the inner weather strip 27w, the belt molding 21b is typically made of a rubber material and includes two lips extending toward the outer surface of the window glass 25. The two lips of the belt molding 21b elastically deform by abutting with the outer surface of the window glass 25 and seal between the outer surface of the window glass 25 and the outer panel 21. Flocking (not shown) is performed on respective surfaces of the lips of the belt molding 21b. Flocked parts of the belt molding 21b abut with the outer surface of the window glass 25. When the flocked parts of the belt molding 21b abut with the outer surface of the window glass 25, a frictional force to be caused between the outer surface of the window glass 25 and the belt molding 21b is reduced. As a result, the window glass 25 smoothly moves on the surface of the belt molding 21b. Thus, the belt molding 21b slidably makes contact with the outer surface of the window glass 25. Note that the outer panel 21 may be a sheet metal part. In that case, like the inner weather strip 27w, the belt molding 21b may be fixed by being inserted in the upper end of the outer panel 21 made of a sheet metal. Further, flocking may not be performed on the two lips of the belt molding 21b.

As has been described earlier, the recess 301 is provided on the door trim 30, so that the door 20 of the vehicle 10 (see FIG. 1) of the embodiment secures a space for receiving the hand 40 of the user. The recess 301 is formed by partially denting the surface of the upper part of the door trim 30. On this account, in a part where the recess 301 is formed, the position of the upper part of the door trim 30 is partially lowered. As illustrated in FIG. 4, in the door 20, the position of the inner weather strip 27w is placed below the position of the belt molding 21b in the vehicle up-down direction. Hereby, even in a case where the recess 301 is provided in the door trim 30, the inner weather strip 27w and the recess 301 do not interfere with each other.

Further, when the recess 301 is provided in the door trim 30, the inner surface 30i of the recess 301 is placed below, in the vehicle up-down direction, an upper end part (that is, an upper end 21t) of the belt molding 21b in the vehicle up-down direction, as illustrated in FIG. 4. A wall surface 30w is provided on the outer side of the recess 301 in the vehicle width direction. The upper end 30t of the wall surface 30w is placed above the upper end 21t of the belt molding 21b in the vehicle up-down direction. That is, the wall surface 30w extends upward of the belt molding 21b in the vehicle up-down direction. Hereby, the wall surface 30w covers the left surface of the belt molding 21b (that is, the inner surface of the belt molding 21b in the vehicle width direction). As a result, the user cannot see the belt molding 21b from the inside of the vehicle.

FIG. 5 is a sectional view taken along a line V-V in FIG. 4. That is, FIG. 5 illustrates the shape of the recess 301 of the door trim 30 viewed in the vehicle right-left direction. As indicated by a broken line in FIG. 5, in the part where the recess 301 is provided, the belt molding 21b extends in the front-rear direction outside the wall surface 30w in the vehicle width direction. In front of and behind the recess 301, the belt molding 21b extends in the front-rear direction outside the door trim 30 in the vehicle width direction. That is, the user does not see the inner surface of the belt molding 21b in the vehicle width direction from the inside of the vehicle. As such, since the recess 301 is provided in the door trim 30, the door 20 of the vehicle 10 (see FIG. 1) of the embodiment secures a space for receiving the hand 40 of the user between the door trim 30 and the knob 60 placed at the lower limit position. Further, by extending the wall surface 30w upward of the belt molding 21b in the vehicle up-down direction, the door 20 covers the inner surface of the belt molding 21b in the vehicle width direction.

Further, as illustrated in FIG. 5, a rear part of the inner surface 30i of the recess 301 extends generally in parallel to the direction where the knob 60 moves. Meanwhile, a front part of the inner surface 30i of the recess 301 is curved and connected to the upper surface of the door trim 30. That is, the inner surface 30i of the recess 301 has an asymmetric shape in the vehicle front-rear direction.

The specific example of the present disclosure has been described in detail. However, the example is for illustration only, and does not limit the scope of the claims. The technology described in the scope of the claims includes the foregoing example with various modifications and changes. Each of and various combinations of the technical elements described in this specification and the drawings achieve technical utility, and the technical elements are not limited to the combination stated in the claims at the time of filing. The technology described in this specification and the draw-ings as an example is able to achieve a plurality of objectives simultaneously and has technical utility by achieving one of the objectives.

What is claimed is:

1. A vehicle comprising:
a vehicle body; and
a door provided openably and closably in the vehicle body, the door including a window frame, wherein:
the door includes
an outer panel,
a door trim placed inward of the outer panel in a vehicle width direction,
window glass configured to be manually raised and lowered, the window glass being placed between the outer panel and the door trim, the window glass being supported movably between an upper limit position at which the window glass closes an opening of the window frame and a lower limit position at which the window glass opens the opening of the window frame,
a belt molding fixed to an inner surface of the outer panel, the belt molding slidably making contact with an outer surface of the window glass, and
a knob provided on an inner surface of the window glass, the knob being configured to be gripped by a user who operates the window glass;
the door trim includes a recess configured to face the knob when the window glass is placed at the lower limit position;
when the window glass is placed at the lower limit position, a space is formed between the knob and an inner surface of the recess such that the space receives a hand of the user, the hand gripping the knob;
at least part of the inner surface of the recess is placed below, in a vehicle up-down direction, an upper end part of the belt molding in the vehicle up-down direction; and
a wall surface extending upward, in the vehicle up-down direction, of the upper end part of the belt molding is provided on an inner side or an outer side of the recess of the door trim in the vehicle width direction.

2. The vehicle according to claim 1, wherein the wall surface is placed on the outer side of the recess in the vehicle width direction.

3. The vehicle according to claim 1, wherein at least part, of the door trim, that is placed around the recess is placed inward, in the vehicle width direction, of an inner end part of the knob in the vehicle width direction.

4. The vehicle according to claim 1, wherein the inner surface of the recess is inclined downward in the vehicle up-down direction as the inner surface is distanced from the wall surface.

5. The vehicle according to claim 1, wherein the inner surface of the recess has an asymmetric shape in a vehicle front-rear direction.

6. The vehicle according to claim 5, wherein a direction where the window glass moves is inclined from the vehicle up-down direction when the window glass is viewed along a vehicle right-left direction.

7. The vehicle according to claim 1, wherein the door further includes a knob fixture provided on the outer surface of the window glass such that the knob is fixed to the knob fixture via the window glass.

8. The vehicle according to claim 7, wherein:
the knob includes a movable hook to be operated by the user; and the window frame includes a hook receiver configured to lock the window glass by engaging with the hook when the window glass is placed at the upper limit position.

\* \* \* \* \*